(No Model.)
J. W. HYATT
Machine for the Manufacture of Slate Pencils.
No. 232,720. Patented Sept. 28, 1880.
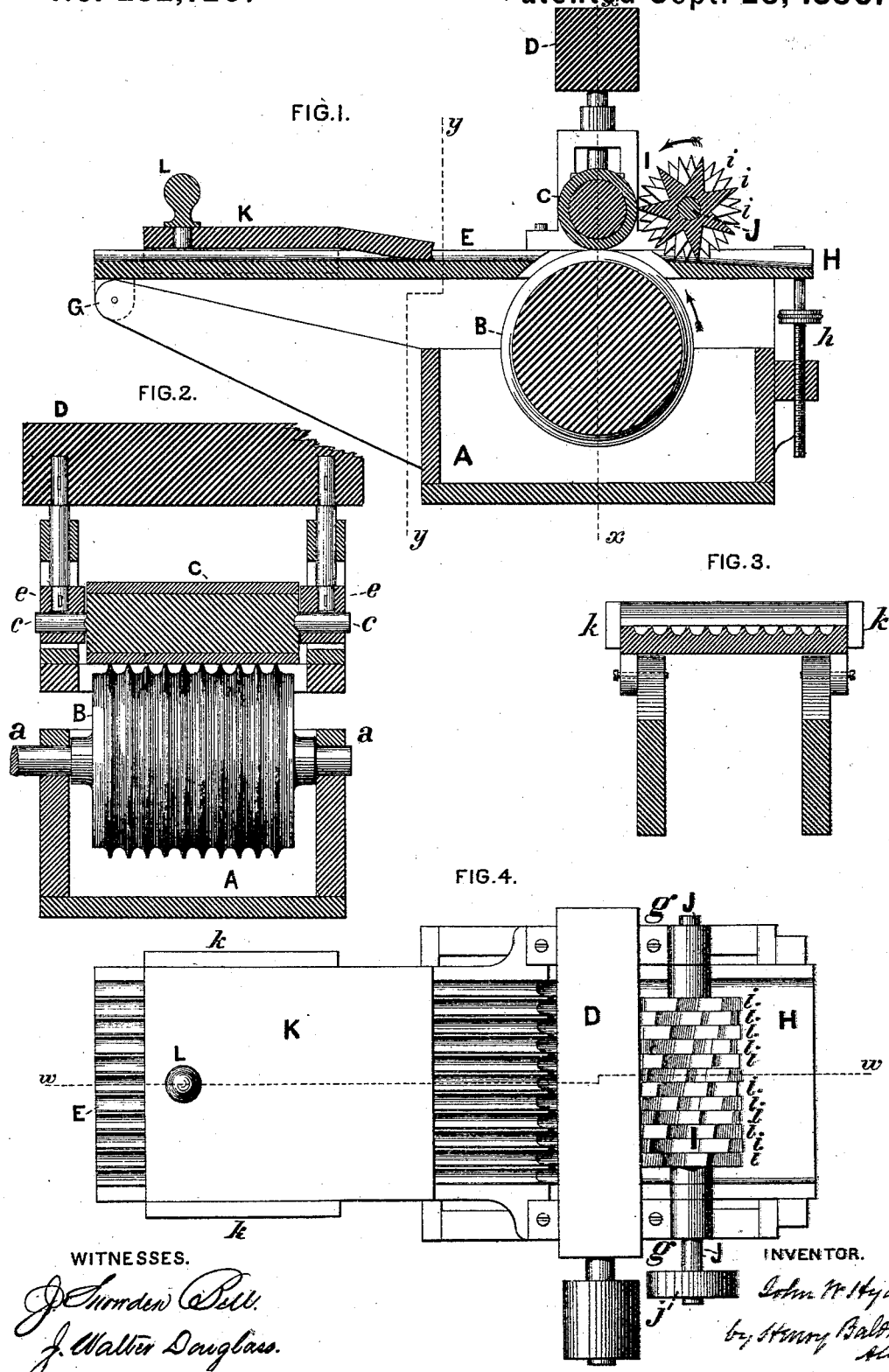
WITNESSES.
INVENTOR.

UNITED STATES PATENT OFFICE.

JOHN W. HYATT, OF NEWARK, NEW JERSEY, ASSIGNOR TO EMBOSSING COMPANY, OF ALBANY, NEW YORK.

MACHINE FOR THE MANUFACTURE OF SLATE-PENCILS.

SPECIFICATION forming part of Letters Patent No. 232,720, dated September 28, 1880.

Application filed July 12, 1880. (No model.)

*To all whom it may concern:*

Be it known that I, JOHN W. HYATT, of Newark, in the county of Essex and State of New Jersey, have invented certain new and useful Improvements in Machines for the Manufacture of Slate-Pencils, of which improvements the following is a specification.

My improvements relate to machines in which a slab of slate is cut into cylindrical or prismatic strips by means of revolving cutters; and the object of my invention is to feed the slab with uniformity and certainty, to prevent the fracture of the strips during the operation of cutting, and to throw out the strips after the cutting is complete.

In the accompanying drawings, Figure 1 represents a vertical longitudinal section through the machine on the line $w\,w$ of Fig. 4. Fig. 2 is a view partly in section and partly in elevation, the sectional part being on the line $x\,x$ in Fig. 1. Fig. 3 is a cross-section of the feed-table on the line $y\,y$ of Fig. 1; and Fig. 4 is a top or plan view of the machine.

The water-trough A is provided at its top with bearings $a$ for the cutter-roll B. The cutter-roll B is constructed with an iron core covered with emery or other suitable grinding material, which is molded into a series of ridges with intervening grooves, as shown in the drawings, the ridges being the cutters. I, however, contemplate using in some instances, as a substitute for the emery cutters, a gang of circular saws secured to the shaft by intervening collars.

Above the cutter-roll B is placed the bearing-roll C, journaled at $c$ in vertically-sliding boxes $e\,e$, which may be weighted, as shown in the drawings, by a weight, D, or may be adjustable vertically in any ordinary manner. The surface of the roll C is to be made of rubber, felt, or other similar yielding and elastic material, and it is so arranged as to barely come in contact with the cutter-edges.

The feed-table E is constructed with a grooved upper surface, as shown, so as to accommodate slabs partially formed, with which, as hereinafter explained, it may be used. These grooves correspond with the spaces between the cutting-edges of the cutter-roll B. The table, however, may be constructed with a flat surface, and I therefore do not desire to limit its construction to the exact form shown.

The table E is pivoted at G, and provided at its outer end with arms $g\,g$, upon which the frame of the journal-boxes $e\,e$ is mounted. Beyond the rolls these arms carry a chute-board, H, to discharge the blanks or strips, and beneath the chute-board is placed an adjusting-screw, $h$, by which the table and its frames can be raised or lowered. Over the head of the chute-board H, and upon the arms $g\,g$, is mounted the discharger I, constructed of a series of star-shaped pieces of rubber, $i\,i$, secured to a shaft, J, which is revolved by the pulley $j$.

The feed-plunger K fits upon the grooves of the feed-table and has guide-pieces $k$. It may be worked by hand, for which purpose it is provided with the handle L, or it may be provided with an automatic reciprocating device.

My improved machine above described may be used to operate upon flat slabs, or upon slabs partially cut, such as can be formed by the machine patented to me in Letters Patent No. 204,151, dated May 28, 1878. It is to receive such partly-cut slabs that the grooves of the feed-table, as shown in the drawings, are specially adapted; but the presence of the grooves in no way interferes with the working of the machine upon uncut flat slabs.

The mode of operation is as follows: The trough A being filled with water to such a level as to immerse the lower portion of the cutter-roll B, the latter is rapidly revolved toward the feed-table, and the slab of slate upon the table is fed toward the cutters by the feed-plunger K. The bearing-roll C presses the slab as it is fed closely and firmly against the cutters, and thus insures the thorough division of the blanks or strips, while, by reason of its yielding and elastic surface, the pressure of the bearing-roll is evenly distributed, and the danger of breaking the slab or blanks is obviated.

By means of the sliding journal-boxes $g\,g$ the pressure of the roll C can be regulated, and the relative positions of the cutting-edges and feed-table can be varied by the adjusting-screw $h$.

The discharger I is revolved in the direction of the arrow, Fig. 1, at a speed somewhat greater than that with which the slab is fed to the cutters, and thus, as the blanks or strips emerge from beneath the bearing-roll C they are seized and discharged down the chute-board H into any receptacle which may be provided.

In some instances, however, I contemplate using another mode of discharging the blanks. The discharger I having been removed, a pulley is attached to the shaft of the bearing-roll C, and the latter, being adjusted so as to bear properly upon the blank, is revolved in a direction opposite to that of the cutter-roll B, and with a speed somewhat greater than that with which the blanks are fed. The result of this mode of arrangement is that during the cutting of the slab the motion of the bearing-roll is retarded by its pressure upon the slab, and its belt slips, and at the completion of the cut, this pressure being relieved, the belt of the bearing-roll again takes hold, and the roll starts into rapid revolution, throwing out the blanks or strips upon the chute-board. In this case the bearing-roll C also performs the function of the discharger I.

Having thus described the nature and objects of my invention, what I claim as new, and desire to secure by Letters Patent, is—

1. In a machine for cutting pencil-blanks from a slab of slate by the operation of revolving cutters, the combination, with the cutter-roll, of a bearing-roll having a yielding and elastic surface, substantially as described.

2. The combination of the cutter-roll and the bearing-roll with the discharger, which revolves at a speed greater than that with which the slab is fed, substantially as and for the purpose described.

3. The method of discharging the blanks or strips by revolving the bearing-roll C at a speed greater than that with which the slab is fed, substantially as described.

4. The combination of the adjustable feed-table and its feed-plunger with the cutter-roll and bearing-roll, substantially as and for the purposes described.

JOHN W. HYATT.

Witnesses:
ABRAHAM MANNERS,
J. W. FORCE.